United States Patent [19]

Weightman et al.

[11] Patent Number: 4,921,273
[45] Date of Patent: May 1, 1990

[54] SHOULDER BELT MINICOVER AND CUSHION

[76] Inventors: Judy M. Weightman; Andrew K. Mirikitani, both of 1717 Mott-Smith Dr., No. 1501, Honolulu, Hi. 96822

[21] Appl. No.: 292,429

[22] Filed: Dec. 30, 1988

Related U.S. Application Data

[60] Continuation of Ser. No. 57,637, Jun. 4, 1987, Pat. No. 4,795,190, Division of Ser. No. 818,319, Jan. 13, 1986, abandoned.

[51] Int. Cl.$^5$ ...................... B60R 22/14; B60R 22/28
[52] U.S. Cl. ..................................... 280/808; 280/751; 297/482
[58] Field of Search ............... 280/801, 802, 808, 751; 297/465, 482

[56] References Cited

U.S. PATENT DOCUMENTS

| | | | |
|---|---|---|---|
| 3,306,662 | 2/1967 | Finnigan | 297/389 |
| 3,397,913 | 8/1968 | Fein | 297/385 |
| 3,572,833 | 3/1971 | Pavliscak | 297/385 |
| 4,595,618 | 6/1986 | Cariñger | 428/100 |
| 4,678,205 | 7/1987 | Wold | 280/808 |

FOREIGN PATENT DOCUMENTS

| | | |
|---|---|---|
| 2641852 | 3/1978 | Fed. Rep. of Germany . |
| 2838821 | 3/1980 | Fed. Rep. of Germany . |
| 2931339 | 2/1981 | Fed. Rep. of Germany . |
| 3434010 | 6/1986 | Fed. Rep. of Germany . |
| 2436608 | 5/1980 | France . |
| 2524810 | 10/1983 | France . |
| 2530208 | 1/1984 | France . |
| 1581996 | 12/1980 | United Kingdom . |
| 2048651 | 12/1980 | United Kingdom . |

Primary Examiner—Richard A. Bertsch
Attorney, Agent, or Firm—James Creighton Wray

[57] ABSTRACT

The invention provides clean and decorative wraps for automotive shoulder belts. The shoulder belt minicover and cushion wraps around and closes with hook and pile type fastening or closure. The minicover for the shoulder belt may have an intermediate layer of padding material. The particular material ranges widely from strong nylon or denim to quilted cloth, fake fur, real fur or sheepskin. The minicover overlies the shoulder and neck area of a user. Bright and reflective surfaces of minicovers indicate sholder belt usage. Unique shapes and bright colors remind occupants to use seat belts.

6 Claims, 2 Drawing Sheets

U.S. Patent  May 1, 1990  Sheet 1 of 2  4,921,273
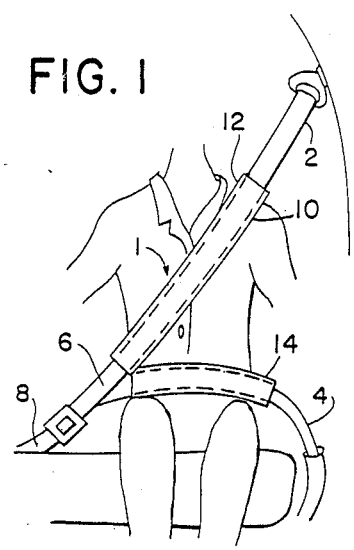
FIG. 1
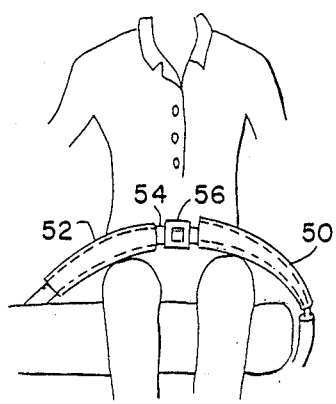
FIG. 2
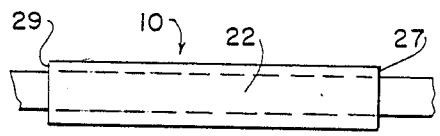
FIG. 3
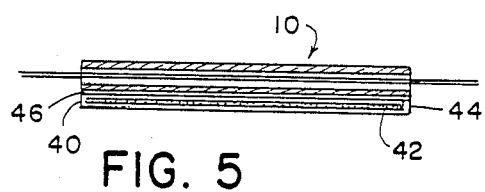
FIG. 5
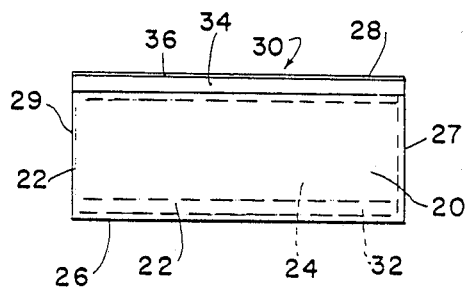
FIG. 4
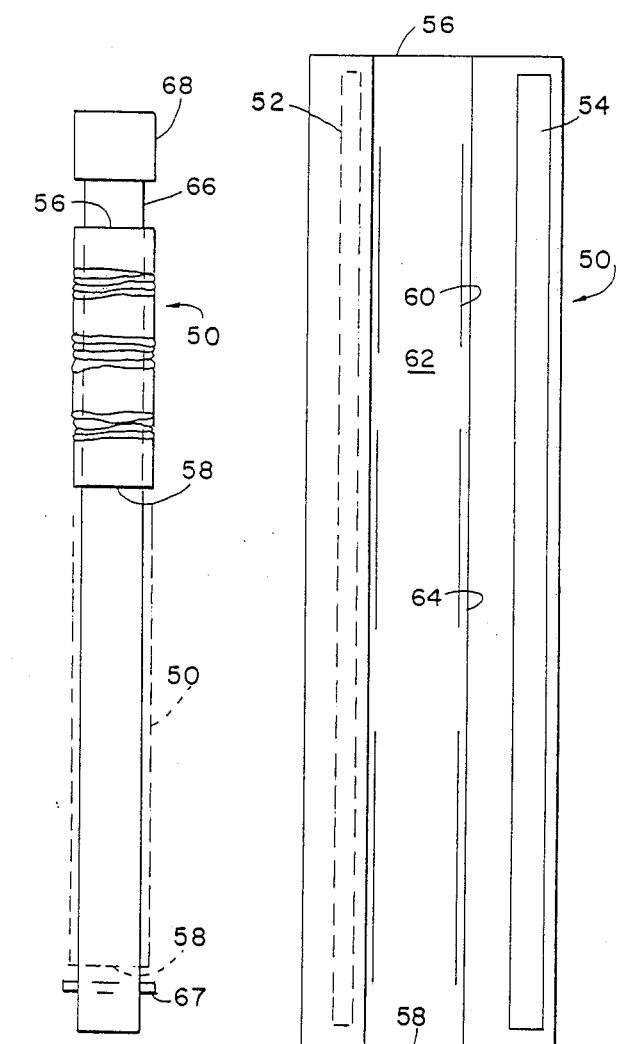
FIG. 7
FIG. 6

SHOULDER BELT MINICOVER AND CUSHION

This application is a continuation of U.S. application Ser. No. 057,637, filed June 4, 1987, now Patent No. 4,795,190, which is a divisional of U.S. application Ser. No. 818,319, filed Jan. 13, 1986, now abandoned.

BACKGROUND OF THE INVENTION

This invention concerns seat belt covers and pads. Many states, and all of Canada, now require that seat belts be worn while driving. It is probable that many more states will require the wearing of seatbelts. Many motorists forget to wear seat belts. Many motorists and passengers complain about the wearing of seatbelts for two reasons: (1) Seat belts are uncomfortable and (2) seat belts are not always very clean. Moreover, when worn, seat belts have discomfort zones where edges of belts approach the body or the clothing. One discomfort zone is at the neck of a wearer, particularly at the left side of the neck, shoulder or upper chest, in left-hand drive automobiles, and at right side of neck, shoulder or upper chest for front passengers, where the shoulder belt first touches the body or clothing of a user.

A need exists to provide an immediately visible confirmation of seat belt usage without unnecessarily delaying drivers. A need exists to provide comfortable and clean seat belts and to provide a reminder.

SUMMARY OF THE INVENTION

The invention provides clean and decorative wraps for automotive seat belts. Separate parts encase the lap belt and shoulder belt. Both parts wrap around the belt and close with Velcro closures. The wrap for the shoulder portion may hold a soft cushioning pad especially on the side which will face the wearer. Padding extends for the entire length of one face of the belt or is confined to surfaces facing the neck area of a user or the shoulder area and the waist area. The particular material ranges widely from strong nylon, leather or denim to a velvet quilted cloth, fur type fabrics, fake fur, real fur or sheepskin.

In one preferred form of the invention a plain rectangular decorative fabric panel has a hook or loop Velcro strip along a longitudinal edge portion of one face and a complementary strip along the opposite edge portion of the opposite face. The strips may be discontinuous and may be constructed in spaced sections to save expense and to permit rapid or flexible fitting.

The present invention provides seat belt wraps to help make seat belt wearing delightful and stylish, thus, encouraging people to buckle-up for safety.

The seat belt wrap is an accessory which is attached to the two seat belt straps, the waist and shoulder portions on the newer cars and the two parts of the lap seat belt on the older cars. The seat belt wrap is made of different types of fabric to suit different styles. Each seat belt wrap includes two separate parts to encase each part of the seat belt. The fabric wraps around, e.g., the shoulder belt portion and closes with Velcro fasteners. Each piece can be removed at any time for washing or just to change for new fabric. Additionally, the shoulder portion of the seat belt may contain a soft cushioning pad or padding material especially on the side of the strap which comes in contact with the shoulder and upper chest area. The seat belt strap, which wraps around the waist, can also contain a cushioning pad on the side of the strap that rubs against the waist. Each piece of fabric or sleeve thus wraps around each strap of the seat belt and fastens with Velcro strips, similar to the wallets that close with Velcro strips. The pads can be removable as well. Padding extends from the length of the belt or is confined to the shoulder and/or the waist areas. Users of the covers and pads are clean, comfortable and safe.

The invention is carried out with all types of fabrics, closures and padding. Some wraps have padding inserts wherever the belt touches the body. The invention includes personalized and designer belt wraps, a fashion accessory as well as a way to encourage people to use their seatbelts. The beltwraps range from nylon backpack type fabric to denim to quilted to kettlecloth to fake fur to sheepskin and more.

The invention furthers the social policy of the states, for example, Hawaii, and the country; saves lives as well as saves clothes; provides comfort with safety; and enables all to be beautifully buckled.

In the present seat belt wrap the padding is not an integral unit with the fabric. Padding is optional with the decorative cover. The product does not have padding within a casing. The fabric is used independently of any padding. However, various sizes of shoulder pad type padding that can be attachable/detachable pieces are basically on padding material enclosed in small fabric pads having hook and pile type fastening systems or any type stick on system. Padding, if used at all, may be used on both sides or only on one side of the belt, the side against the wearer. The pad, if used, is stuck on to one side of the fabric wrap with a releasable non-residue, reusable sticky substance such as produced by Creat O Matic, a Quebec company. One emobidiment does have padding encased within the full belt cover on both sides. Padding does not overlap the full belt.

The present invention is easy to use, thus it is likely to be used by the average driver and passenger. The main function of the invention is to provide a detachable fabric cover for easy cleaning so as to encourage seat belt use.

The invention provides a decorative cover apparatus for an automotive seat belt comprising an elongated rectangular fabric panel having inner and outer faces and having a decorative outer surface. The panel is flexible and supple. The panel has first and second generally parallel opposite relatively long edge portions and first and second opposite generally parallel relatively short edge portions respectively connecting complementary end portions of the opposite elongated edge portions. First fastener means extend along one long edge portion on a first surface of the panel and complementary second fastener means extend along a longitudinal edge portion of a second opposite surface of the panel, whereby after folding the panel around an automotive seat belt the first and second fastener means are juxtaposed and joined together to hold the fabric panel around the seat belt.

The preferred first and second fastener means respectively comprise complementary microhook and microloop fasteners.

Preferably the first fastener means is positioned directly along one edge portion on the first surface of the panel and the second fastener means is positioned on a longitudinal edge portion spaced slightly inward from the longitudinal edge of a second opposite surface of a panel, whereby after folding the panel around an automotive seat belt, a portion of the longitudinal edge, which extends beyond the second fastener means, also extends beyond a first fastener means in use so as to prevent unwanted contact with the first fastener means.

In one embodiment the decorative panel is precreased for folding around an automotive seat belt.

In one embodiment the first and second fastener means comprise releasable adhesive type fastener means, and the second fastener means comprises an edge portion of the panel which receives the releasable adhesive means.

The invention provides an elongated cushion for extending along an outer surface of a panel when the panel is wrapped around a seat belt and when the first and second fastener means are cooperatively secured. The cushion has means for attaching the cushion to the outer surface of the panel.

In one preferred embodiment the cushion comprises a foam block or other types of padding material enclosed in a decorative covering. The means for attaching the cushion comprises means for cooperating with the outer surface of the decorative fabric panel of the cover apparatus.

The preferred means for attaching the cushion to the panel comprise a dry-type releasable fabric adhesive.

In one embodiment the first and second fastener means comprise a dry-type releasable adhesive.

The invention provides seat belt cover apparatus for an automotive seat belt comprising an elongated wrap-around fabric tube having open opposite longitudinal ends and having one longitudinally extending edge portion overlying another longitudinal portion of the wrap-around tube and fastener means connecting the said one longitudinal edge portion and the said other longitudinal portion of the wrap-around tube.

Preferably the fastener means comprises a first fastener means on the one longitudinal edge portion and a second complementary fastener on the other longitudinal portion.

Preferably the fastener means comprises complementary microhook and microloop fastener means respectively mounted on the one longitudinal edge portion and on the other longitudinal portion.

In one embodiment the fastener means comprises dry type fabric adhesive coating at least one of the longitudinal edge areas.

In one embodiment the dry type fabric adhesive is coated on both longitudinal edge areas.

Preferably a padding means is connected to the wrap-around tubular means. The padding means comprises an elongated generally flat foam insert or padding material and a fabric cover covering the foam or padded insert and further comprise means for connecting the fabric cover to the wrap-around tube.

The preferred means for connecting the fabric cover to the wrap-around tube comprises a dry type fabric adhesive.

In the preferred embodiments first and second wrap-around tubes respectively connect to the shoulder belt and the waist belt portions of an automotive safety belt.

The invention provides a cushioned device for an automotive safety belt comprising an elongated cushion pad for extending along a seat belt, a fabric cover covering the pad, and a dry type releaseable adhesive along one outer surface area of the fabric cover for attaching the fabric cover and the cushioned device to a seat belt.

Preferably a wrap-around elongated flattened tube-like seat belt cover has a fastener means extending along one longitudinal edge of the wrap-around cover for attaching the longitudinal edge portion of the wrap around cover to another portion of the cover. The wrap-around tubular seat belt cover receives the dry type adhesive on the cushion for holding the cushion on the seat belt wrap-around cover.

One embodiment of the invention provides a minicover which is used independently or in addition to the basic cover or covers. The minicover is a small padded cover that extends around a portion of the shoulder belt at the area where the shoulder belt first contacts the upper body of the wearer. The minicover comforts the wearer and gives visual indication that the seat belt is in use.

The minicovers may be made in various shapes and sizes including but not limited to heart shapes, circles, ovals, squares, rectangular shapes, or football shapes.

In one preferred embodiment, the minicover is made of overlying eliptical laminates of a wide range of different materials from nylon to cloth, furry fabrics, fake fur, real fur sheepskin or cloth felt and cloth, which can be stitched before being medially folded, stuffed with foam or pillow or similar padding material and edge stitched. Two fastener strips either velcro and/or adhesive or buttonsnaps at opposite edges therein hold the minicover around the shoulder belt.

In one preferred embodiment, the outersurface of the minicover which is exposed when attached around the shoulder belt and which is the side not contacting the body of the wearer contains one of various designs, shapes and forms including but not limited to various flowers, fruits, animals (e.g. a teddy bear head) miniature tennis rackets, footballs, baseballs, basketballs, or images of faces.

In one form of the invention, the seatbelt attachment is a visual indicator constructed for using on a seatbelt above the shoulder of a user. The visual indicator is visable through a window of the vehicle to indicate that an individual is wearing a seat belt. The indicator may be similar to a reflector used on bicycle fenders. The indicator may be made of vinyl with a cardboard insert to give it rigidity or be made of a plastic material with a highly reflective surface such as used on running shoes. Alternatively, the indicator may be made of any brightly colored material. The indicator may be constructed of any one of a number of shapes. The preferred shape is circular. The indicator may be clipped on to the seatbelt such as by an alligator clamp. Preferably, the indicator is two sided so that it indicates seat belt usage from both faces. That preferred embodiment the indicator is made flat and is medially creased to fit around a belt and opposite free edges are provided with velcro or other adhesive to complete the wrapping of the indicator around the belt. The inside of the indicator may be made of material which freely slides along the belt while the indicator is being pushed along the belt but which maintains its position on the belt when no longitudinal force is applied on the indicator.

In one form of the invention, the cover, minicover or indicator, each of which may be referred to simply as a cover, is connected to the belt with slits on the body side of the cover which faces the wearer so that the belt passes in and out of the slits to fold the cover on the belt. In an alternate form, the cover, minicover or indicator is constructed as a flattened tube open at opposite ends to receive the seat belt which slides through the cover.

These and other and further objects and features of the invention are apparent in the disclosure which includes the above and ongoing specification and the drawings.

BRIEF DESCRIPTION OF THE DRAWINGS

FIG. 1 represents a seat belt using the cover of the present invention on the shoulder and waist portions of the belt.

FIG. 2 shows an airplane belt or an old type automobile belt with a central buckle using the covers of the present invention on opposite halves of the belt.

FIG. 3 is a detail of the wrap-around tube.

FIG. 4 is a detail of the wrap-around tube laid flat.

FIG. 5 is a detail of the covered cushion pad adhesively secured to the seat belt cover.

FIG. 6 is a detail of a slit cover.

FIG. 7 is a detail of a bunched cover ready for extending along a belt.

DETAILED DESCRIPTION OF THE DRAWINGS

Figure 10:
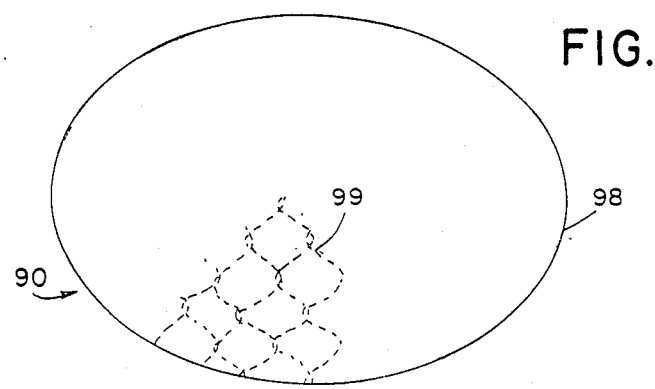
FIG. 10 is a detail of the eliptical plan form of the starting laminations.

Referring to FIG. 1 an automotive type seat belt is generally referred to by the numeral 1. The seat belt has a shoulder portion 2 and a lap portion 4 which are joined together 6 near the buckle portion 8.

A wrap-around tubular decorative cover 10 is mounted on the shoulder portion to the seat belt. The decorative cover 10 has a portion 12 which extends above the shoulder of the wearer and which can be brightly colored so that the presence or absence of the seat belt in use may be readily ascertained by those outside of the vehicle.

A tubular cover 14 similar to tubular cover 10 but substantially shorter surrounds the waist belt 4 in the area which overlies the lap of the user.

As shown in FIGS. 3 and 4 the wrap-around decorative cover 10 is made of a rectangular shape 20 of material having an outer face 22 and an inner face 24 and having first and second generally parallel opposite longitudinal edges 26 and 28. And opposite and parallel end edges 27 and 29. Fastener means 30 are mounted on the wrap-around sheet along the longitudinal edges thereof. A fastener means 32 is mounted along an edge 26 on inner face 24. A fastener 34 is mounted on outer surface 22 along edge 28.

In one embodiment of the invention, the fastener means 30 comprise cooperating microhook and microloop type fasteners. In a preferred embodiment, one of the fasteners on the overlapping edge is spaced slightly inward for a short distance 36 from edge 28 so that the edge 36 may be grasped without touching the fastener portion 34 and so that the fastener portion 34 and fastener portion 32 are fully covered so they do not come in contact with clothing. Preferably fastener 32 has loops and fastener 34 has hooks.

In a preferred embodiment of the invention, a pad 40 made of a long thin foam cushion or pading material 42 encased in a cover 44 is attached to an outer surface 22 of the belt cover 10. In a preferred embodiment the cushion 40 is attached by a dry type fabric adhesive 46 such as a pressure sensitive adhesive which remains firmly attached to one portion of the cover 44 while releaseably attaching the cover 44 of the pad 40 to the outer surface 22 of the cover 10. The adhesive is any suitable adhesive such as a dry type self sticking adhesive such as those used on pads attached to clothing which may be removed without damaging the clothing.

Examples of such adhesives are used in attaching pads inside shoulder and arm areas and in undercloth ing. Adhesive pads may be used with or without the decorative covers but are preferably used with the covers. The invention is suitable for use with airline belts in which two covers 50 and 52 are wrapped around opposite portions of a belt 54 with a center buckle 56.

When the seatbelt cover is used with a retractable belt the supple fabric slides along the belt and bunches together as the belt is retracted. When or after the belt is extended, the fabric is slid along the belt by hand to restore it to a substantially full cover.

In one preferred embodiment as shown in FIG. 6, a cover 50 has fastener areas 52 and 54 and short end edges 56 and 58. Slits 60 spaced by solid areas 62 are provided near or at creases 64 to facilitate sliding and bunching of the cover. When the belt 66 is re-extended as shown in FIG. 7, end 56 near buckle 68 is held in place by friction or by hand while the other end 58 is slid along the belt 66 toward bracket 67 to fully cover the belt, as shown in broken lines.

In one preferred embodiment, the dry-type, self-sticking and releaseable fabric adhesive is used as the fastening for the wrap-around tube. The tubes provide highly decorative bright and clean coverings which provide an awareness of seat belts both as a reminder to use the belts, and as an indication that the belts are in use. The wrap-around fabric tubes are easily removed from the seat belts and washed and returned to the seat belts. Numbers of decorative tubes may be sold in packages so that the fabric designs may be interchanged and so that the fabric covers may be removed, discarded and replaced inexpensively and without substantial effort.

The present invention overcomes problems in the prior art by encouraging and identifying seat belt usage and by providing fresh clean attractive seat belts which are acceptable to use and which will not damage, discolor, or soil clothing.

A shoulder belt neck cushion minicover is generally indicated by the numeral 70. The cover 70 has a longitudinal rolled fold 72 which may contact the neck and shoulder of the user. The underside 74 of the cushion also may contact the neck and shoulder of the user while the upper side 76 will be visible from outside the car for a visual indication. The entire cushion 70 can be covered with a bright material in a preferred embodiment or the upper side 76 may have bright or reflective material attached thereto.

The cushion has an inner surface 78 which contacts the belt. Because of the particular construction of the preferred embodiment of the cushion, the inner surface 78, the rear surface 74, and the upper surface 76 are all formed from the same piece of material.

As shown in the drawings, fastener strips generally indicated by the numeral 80 are attached along edge portions of the inner surface 78 from the lower edge 82 of the cushion along the other edge 84 to a position where the curved outer edge 84 joins the upper edge 86. The fasteners 80 are preferably made of cooperating strips of microloop fasteners 87 and microhook fasteners 88.

Figure 9:
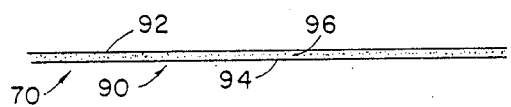
FIG. 9 is a detail of laminations of the initial step in manufacture of the minicover.

As shown in FIG. 9, the neck cushion minicover 70 is made from a preliminary body 90 having an inner woven fabric layer 92, an outer woven fabric layer 94 and a middle non-woven bulky layer 96 which is preferably made of a lightweight synthetic felted or other padding material. The inner layer 92 is preferably made of any shape retaining material and the outer layer 94 is preferably made of a soft material such as cotton, nylon, soft vinyl, wool or sheepskin, real fur, fake fur etc. since the outer layer 94 when folded becomes the outer surface of the neck cushion minicover 70. As shown in FIG. 10, layers of the body 90 have a generally eliptical outer edge 98. Quilting type stitches 99 hold the laminate together.

Figure 11:
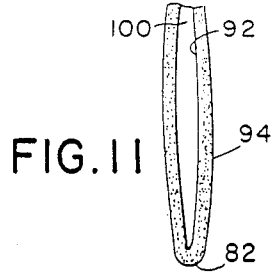
FIG. 11 is a detail of the folding and stuffing of the laminations along a medial edge.
Figure 12:
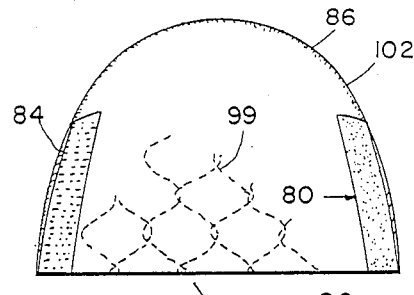
FIG. 12 is a detail of the neck cushion minicover in the open form showing the preferred fastener strips. The minicovers may have different shapes or forms or may carry different decorative additions.
Figure 8:
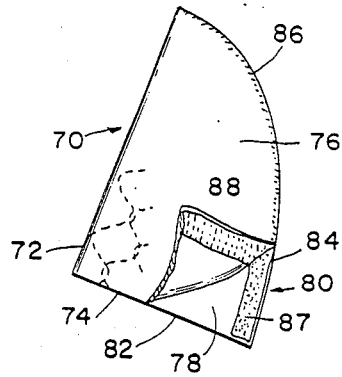
FIG. 8 is a detail of a preferred neck cushion minicover.

As shown in FIG. 11, the laminate is folded medially along fold 82. A stuffing 100 is added either before or after the folding along the medial line 82. The stuffing may be either bulk material which is evenly distributed over the inner surface 92 or the stuffing may be a high loft bulky layer of non-woven material.

A synthetic material stuffing is appropriate or cotton wool is appropriate or any other commonly available stuffing material is suitable.

Figure 13:
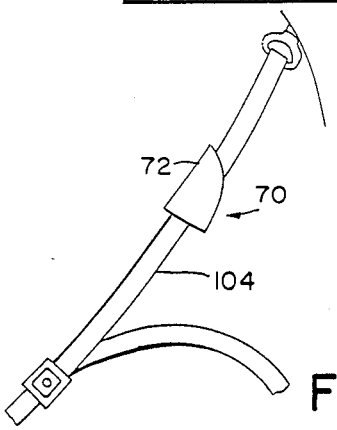
FIG. 13 is a detail of the neck cushion minicover on a shoulder belt.

Once the material has been stuffed and folded, it is stitched 102 along edges 84 and 86. The fastening strips 80 are stitched in place and the cushion 70 is completed. As shown in FIG. 13, the neck cushion 70 is folded along line 72 around the shoulder belt 104.

Figure 14:
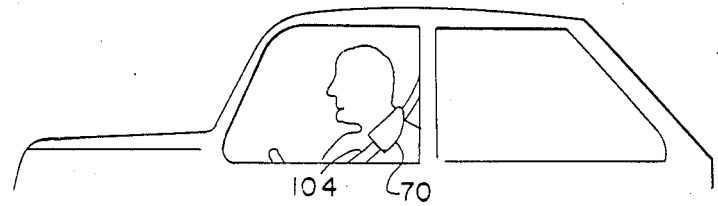
FIG. 14 is a view showing the neck cushion minicover as a seat belt use indicator as seen from outside an automobile.

As shown in FIG. 14, the neck cushion 70 is visable from outside the car to indicate visually that the seat belt is in use.

Bright colors, designs and other unique shapes of the neck cushions and the position of the neck cushions along the belt make positive identification of belt usage possible.

The minicovers are constructed in different shapes, and the minicovers have different designs and shapes on the outer surfaces, e.g. stuffed animals, flowers cartoon characters, heads or smiling faces or shapes of different types of sports equipment, balls, (footballs, baseballs etc.).

Depending on the type of shape, i.e. flower, vs a football shape, the actual height may vary, but will not be so high as to interfere with or cause discomfort to the chin or neck area. (See attached drawings.) The different shapes and forms will allow users to express their individuality while also providing a means of comfort and quick indication that seatbelts are in use.

The neck cushion seat belt cover may take any appropriate shape. For example, the cushion may be square or rectangular or semi-circular when folded or rectangular, square or circular before being folded around the belt.

In one embodiment of the invention, the neck cushion is made of a single layer of material which is medially folded to juxtapose free edges. During the folding, the material is stuffed with a padding material, for example a non-woven polymeric material before the multiple layer cushion material either having no specific form, having a form similar to the product after the medial folding, or having a form which is similar to the sheet before the medial folding. After stuffing, edges of the sheet material are joined together with any suitable method such as by bonding, fusing, or by blind stitches. Alternatively, the device may be stitched and turned inside out before stuffing and completing of the stitching as is conventional in pillows.

The fastener strips which secure opposite vertical edges of the cushion together and hold the cushion around the seat belt may be added after the material has been medially folded, stuffed and stitched. In one embodiment the fastener strips are attached to the sheet material with any suitable means such as by bonding, fusing, or stitching while the sheet material is in a flat state before it is medially folded.

The present invention provides covers for seat belts and neck cushion covers for seat belts which provide cleanliness and comfort to the user and outward visual indications of seat belt use.

In some embodiments of the invention, the minicover does not contain padding on the shoulder area. The minicover in itself without padding adds comfort to the use of the seat belt. Moreover, the minicover with or without padding provides a readily visable indication of use of the seat belt.

In one embodiment of the invention a minicover is used as an indicator when attached to the seat belt above the shoulder of the wearer. In that embodiment the minicover may be constructed of a relatively more rigid material such as a reflector or a vinyl with a cardboard insert to provide rigidity or a plastic or other material with a highly reflective surface such as used on running shoes or of any other brightly colored material. The minicover used as an indicator above the shoulder of a user does not contain padding. It may be made of different shapes as other minicovers.

The minicover may be a clip-on type minicover with an alligator type clip or other type clip mounted on one surface of the minicover that does not come into contact with the user. When the minicover is used as an indicator, the clip may be mounted on the rear of the indicator. Alternatively, a clip may be embedded in the material of the indicator. In one form of the minicover, slits are provided in one or both surfaces of the minicover so that the seat belt passes through the slits. Alternatively, the minicover may be formed as a flattened tube open at both ends so that the seat blet may slide through the minicover.

While the invention has been described with reference to specific embodiments, modifications and variations of the invention may be constructed without departing from the scope of the invention. The scope of the invention is defined in the following claims.

I claim:

1. Shoulder belt minicover and cushion apparatus comprising a neck cushion and minicover having an inner surface and an outer surface for folding medially along a folded edge to juxtapose opposite areas of the inner surface and having fastener strips along free edges opposite the folded edge for fastening the free edges together and leaving a portion of the lower edge and upper edge open for receiving a shoulder belt extending between the juxtaposed areas of the inner surface and extending outward from the upper edge and lower edge whereby the neck cushion and minicover prevents contact of an inner edge of the shoulder belt with the neck or upper body portion of a user.

2. The apparatus of claim 1 wherein the fastener strips comprise hook and loop type opposing strips mounted along opposite edge portions of the inner surface.

3. The apparatus of claim 1 wherein the neck cushion and minicover comprises a body folded along a medial fold generally perpendicular to the folded edge, placing stuffing inside the folded body, wherein free edges of the folded body are provided with fastener strips to secure the apparatus around the shoulder belt.

4. The apparatus of claim 3 wherein the body comprises inner and outer fabric layers and a non-woven layer positioned between the inner and outer fabric layers and quilting type stitches securing the inner and outer fabric layers and the non-woven intermediate layer.

5. The apparatus of claim 4, wherein the body has a general elliptical shape before being folded medially and wherein the cushion has a generally semi-elliptical shape after being folded medially and stitched and wherein the neck cushion has a clam-like quarter-elliptical shape after being folded around a seat belt and secured by the fastening strips.

6. The apparatus of claim 5, further comprising a stuffing material placed in the interior of the semi-elliptically shaped cushion prior to stitching.

* * * * *